J. KILLARS, Jr.
TAKE-UP SCALE.
APPLICATION FILED APR. 24, 1909.
951,006.
Patented Mar. 1, 1910.
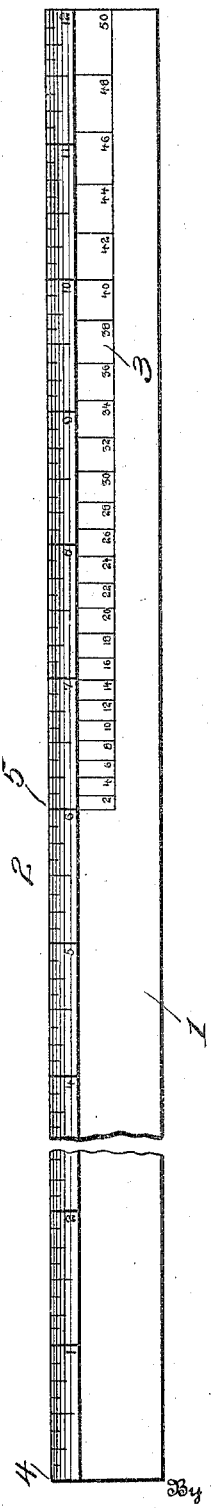
Witnesses
E. R. Ruppert.
U. B. Hillyard.
Inventor
John Killars, Jr.
By Victor J. Evans
Attorney

UNITED STATES PATENT OFFICE.

JOHN KILLARS, JR., OF NORTH ADAMS, MASSACHUSETTS.

TAKE-UP SCALE.

951,006.  Specification of Letters Patent.  Patented Mar. 1, 1910.

Application filed April 24, 1909. Serial No. 491,950.

*To all whom it may concern:*

Be it known that I, JOHN KILLARS, Jr., a citizen of the United States, residing at North Adams, in the county of Berkshire and State of Massachusetts, have invented new and useful Improvements in Take-Up Scales, of which the following is a specification.

The purpose of this invention is to provide a gage for use in the textile industry to determine the percentage of take-up in the warp threads of fabric thereby avoiding the slow and tedious process of obtaining said percentage as by measurements and subsequent calculations.

The percentage of take-up in weaving is for the purpose of determining the amount of warp threads or yarn required to weave a fabric of any length. According to the method usually employed, the fabric to be analyzed is cut in a manner to enable one or more of the warp threads to be obtained after which said threads or yarn are measured both prior to and after being stretched.
After the measurements have been determined, the length of the piece of cloth is subtracted from the length of the warp thread when straightened out and the difference is divided by the length of the warp thread or yarn when straightened and the quotient is multiplied by one hundred which gives the percentage of take-up in weaving.

In accordance with this invention a gage or rule is provided having a portion of a given length laid off corresponding to the length of the fabric whose percentage of take up is to be determined, said gage or rule also having a percentage gage beyond the said laid off portion to indicate the percentage of take-up of the fabric, the graduations of said percentage scale proportionately increasing in length in successive order from the initial marking, said graduations being numbered to correspond with the required percentages.

The invention further contemplates a gage or rule having two linear graduated scales, both scales having a point in common from which reckoning is made, one scale indicating linear measurements according to any recognized system and the other scale indicating the percentage of take-up in the warp threads of the fabric of a given length determined by the linear scale and having its graduations proportionately increasing in length in successive order from the given point in the length of the linear scale.

The drawing illustrates a gage provided with a linear and a percentage take-up scale embodying the essential features of the invention.

The gage or rule comprises a body 1 of any length, width or thickness provided along one edge with a scale 2 for indicating linear measurements, and having a second scale 3 adjacent to and paralleling the linear scale to indicate the percentage of take-up in the warp threads or yarn of a fabric of given length. The linear and percentage scales may vary according to the construction of the gage or rule, but said scale graduations have a determinate relationship. The linear scale is laid off in inches and fractional parts thereof. The percentage scale 3 has its graduations determined with reference to the linear scale or to a part thereof. The numeral 4 indicates the point in common to both scales 2 and 3 from which the measurements are made. The numeral 5 indicates the point in the length of the linear scale from which the graduations of the percentage scale are determined and ascertained. The distance between the numerals 4 and 5 corresponds with the length of the fabric whose percentage of take-up is to be determined. The graduations of the percentage scale are determined by measurements and calculations with reference to the distance between the numerals 4 and 5, or the laid off portion of the gage or linear scale as a unit of measure. It is to be understood that the graduations of the percentage scale may be indicated in any way and for convenience they are designated by multiples of 2. It has been found that the graduations of the percentage scale increase proportionately in successive order from the initial point 5 as indicated most clearly in the drawing and this is the case in every instance no matter how the graduations of the percentage scale may be indicated.

To use the gage the cloth or fabric whose take-up is to be determined is cut to a length corresponding to the laid off distance between the points 4 and 5 of the gage which in the present instance corresponds to six inches. After the cloth or fabric has been cut to the predetermined length one or more warp threads or yarn are obtained and the same are straightened, one end being placed at the point 4 and the opposite end reaching to and beyond the point 5, the distance of reach beyond the point 5 determining the percentage of take-up on reference to the percentage scale 3. Should the end of the thread or yarn extend to the graduation indicated by the numeral 2 on the percentage scale, it may be known that the percentage of take-up is 2. On the other hand, should the end of the thread or yarn extend to the numeral 4, or to the numeral 6, it may be known that the take-up is either four per cent. or six per cent. as the case may be.

The percentage scale 3 is determined by reference to the length between the points 4 and 5 of the linear scale which is six inches, but the distance between the points 4 and 5 may be of any length and the percentage scale determined with reference thereto and when once ascertained the gage remains fixed and it is necessary to cut the fabric or cloth to the length designated by the distance between the points 4 and 5 in order to ascertain the percentage of take-up thereof.

Having thus described the invention, what is claimed is—

A weaver's gage for ascertaining the percentage of take-up in the warp threads of a fabric, the same consisting of a body having a linear scale regularly graduated in standard units of measure and having a percentage scale paralleling a portion of the linear scale, said percentage scale beginning at a distance from the zero point of the linear scale equal to the predetermined length of the warp threads unstretched, and the numerals designating each percentage graduation being determined by dividing the difference between such given length of a warp thread and its length after stretching by the last named length, and multiplying the quotient by one hundred, and each such graduation of the percentage scale being at a distance from the zero point of the linear scale equal to the length of the corresponding thread when stretched.

In testimony whereof I affix my signature in presence of two witnesses.

JOHN KILLARS, Jr.

Witnesses:
J. L. MALCOLM,
ELI D. STONE.